(12) United States Patent
Schelonka et al.

(10) Patent No.: US 7,758,368 B2
(45) Date of Patent: Jul. 20, 2010

(54) DIN RAIL MOUNT

(75) Inventors: Peter A. Schelonka, Plymouth, MN (US); Dennis R. Grabowski, Champlin, MN (US)

(73) Assignee: Honeywell International Inc., Morristown, NJ (US)

( * ) Notice: Subject to any disclaimer, the term of this patent is extended or adjusted under 35 U.S.C. 154(b) by 46 days.

(21) Appl. No.: 11/754,770

(22) Filed: May 29, 2007

(65) Prior Publication Data

US 2008/0299820 A1    Dec. 4, 2008

(51) Int. Cl.
*H01R 13/62* (2006.01)
(52) U.S. Cl. ..................................... 439/325
(58) Field of Classification Search ............... 439/325, 439/716
See application file for complete search history.

(56) References Cited

U.S. PATENT DOCUMENTS

| | | | | |
|---|---|---|---|---|
| 4,067,529 | A * | 1/1978 | Milcoy | 248/222.12 |
| 4,921,445 | A   | 5/1990 | Herbert | |
| 5,047,604 | A * | 9/1991 | Grass et al. | 200/294 |
| 5,192,227 | A   | 3/1993 | Bales | |
| 5,392,196 | A * | 2/1995 | Kinner | 361/809 |
| 5,486,979 | A * | 1/1996 | Bowen et al. | 361/640 |
| 5,602,363 | A   | 2/1997 | Von Arx | |
| 5,704,805 | A   | 1/1998 | Douty et al. | |
| 5,904,592 | A * | 5/1999 | Baran et al. | 439/532 |
| 6,120,000 | A * | 9/2000 | Aeschbach et al. | 248/694 |
| 6,146,213 | A * | 11/2000 | Yoon | 439/716 |
| 6,292,076 | B1  | 9/2001 | DeGrazia et al. | |
| 6,378,825 | B1  | 4/2002 | Yee et al. | |
| 6,431,909 | B1  | 8/2002 | Nolden et al. | |
| 6,563,697 | B1* | 5/2003 | Simbeck et al. | 361/668 |
| 6,569,697 | B2* | 5/2003 | Lu et al. | 438/22 |
| 6,655,982 | B2* | 12/2003 | Bolliger et al. | 439/409 |
| 7,059,898 | B2  | 6/2006 | Barile | |
| 7,073,971 | B2* | 7/2006 | Schurr et al. | 403/325 |
| 7,266,281 | B1* | 9/2007 | Flatau | 385/135 |

FOREIGN PATENT DOCUMENTS

| | | |
|---|---|---|
| EP | 0818062 | 6/1999 |
| EP | 0984537 | 3/2000 |
| EP | 1037347 | 9/2000 |
| EP | 1648064 | 4/2006 |

* cited by examiner

*Primary Examiner*—Truc T Nguyen
(74) *Attorney, Agent, or Firm*—Crompton Seager & Tufte LLC (57) ABSTRACT

A DIN rail mounted device that may be mounted to a DIN rail with minimal components and without requiring the use of tools. In some instances, an electrical device is provided that has one or more integrally formed rigid latches and one or more integrally formed flexible latches. The electrical device may be secured to a DIN rail by first engaging the rigid latches along an upper edge of the DIN rail, and then rotating the device downwards to engage the flexible latches along a lower edge of the DIN rail. The electrical device may be removed by pushing the device upwards, thereby bending the flexible latches downward to a degree where the rigid latches disengage the upper edge of the DIN rail, and then rotating the device forward and down. The flexible latches may be adapted to compress sufficiently to permit this downward travel, and a recess or other opening may be provided behind the flexible latches to allow such movement.

1 Claim, 7 Drawing Sheets

DIN RAIL MOUNT

TECHNICAL FIELD

This disclosure relates generally to electrical devices, and more particularly, to electrical devices that are adapted to be mounted onto a DIN rail.

BACKGROUND

Many building control products and other electrical or control devices may be mounted to a DIN rail. A DIN rail is an elongate rail or track that may be bolted or otherwise mounted to a surface such as a wall. One or more electrical or control devices may then be mounted onto the DIN rail. A DIN rail may permit a user to move a mounted device along the DIN rail or even remove the mounted device entirely from the DIN rail.

In some cases, a device that is configured to be mounted to a DIN rail may include a permanent latch that is configured to engage one side of the DIN rail and a flexible or spring-loaded latch that is configured to engage an opposing side of the DIN rail. In order to remove the device from the DIN rail, a user often needs to pull a latch or press a lever to disengage the locking feature before removing the device from the DIN rail. In many cases, this is accomplished by pulling or pressing the latch or lever with one hand, while holding and pulling the device from the DIN rail with the other hand. Sometimes, it may be necessary to use a tool such as a screwdriver to disengage the locking feature. In many cases, such locking features utilize an excessive number of parts, making the locking feature relatively expensive and complicated to manufacture.

What would be desirable is a DIN rail mounted device that is easier to mount and/or dismount relative to a DIN rail. What would also be desirable is a DIN rail mounted device that permits a user to mount and/or dismount a device relative to a DIN rail with a minimum number of parts and without requiring tools.

SUMMARY

This disclosure relates generally to electrical devices, and more particularly, to electrical devices that are adapted to be mounted to a DIN rail. In one illustrative embodiment, an electrical device is provided that has one or more integrally formed rigid latches and one or more integrally formed flexible latches. In some instances, the device may be secured to a DIN rail by first engaging the rigid latches along an upper edge of the DIN rail, and then rotating the device downwards to engage the flexible latches along a lower edge of the DIN rail. In some cases, the device may be removed by pushing the device upwards, thereby bending the flexible latches downward to a degree where the rigid latches disengage the upper edge of the DIN rail, and then rotating the device forward and down. The flexible latches may be adapted to compress sufficiently to permit this downward travel, and a recess or other opening may be provided behind the flexible latches to allow such movement.

The above summary is not intended to describe each disclosed embodiment or every implementation of the present invention. The Figures and Detailed Description that follow more particularly exemplify these embodiments.

BRIEF DESCRIPTION OF THE FIGURES

The disclosure may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
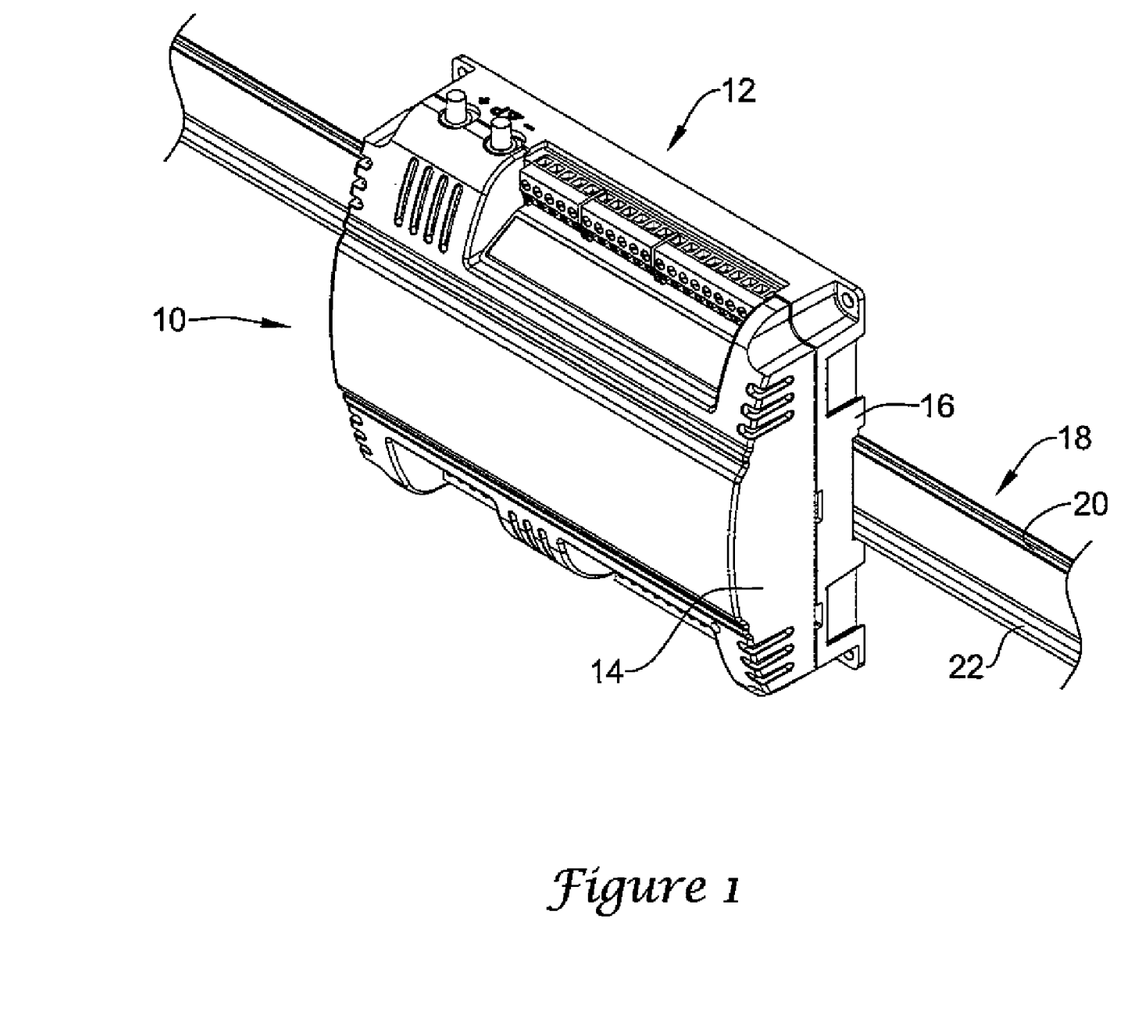
FIG. 1 is a perspective view of an illustrative but non-limiting device secured to a DIN rail.

FIG. 1 is a perspective view of an illustrative but non-limiting electronic device 10 having a housing 12. In the illustrative embodiment, the electronic device 10 is a building controller device, such as an HVAC controller. While in some instances, the disclosure may be described and/or illustrated with respect to an HVAC controller, this is merely for illustrative purposes. It should be recognized that the disclosure pertains equally to a variety of other controllers and other electronic devices that may be disposed within a housing that can be configured to mount to a DIN rail. In some cases, the electronic device 10 may be installed upside-down on DIN rail 18, if desired.

In some instances, housing 12 of electronic device 10 may include a front housing 14 and a rear housing 16 that may snap, fit or otherwise be secured together. Rear housing 16 may, as will be discussed subsequently, include structure that permits electronic device to be mounted or otherwise secured to a DIN rail 18. DIN rail 18 may be seen as including an upper flange 20 and a lower flange 22. DIN rail 18 may be formed of any suitable material and have any suitable dimensions. In some cases, DIN rail 18 may be formed having a particular or standardized height and/or width, but may be any desired length. DIN rail 18 may include mounting apertures (not shown in FIG. 1) for mounting DIN rail 18 to a surface such as a wall.

Figure 2:
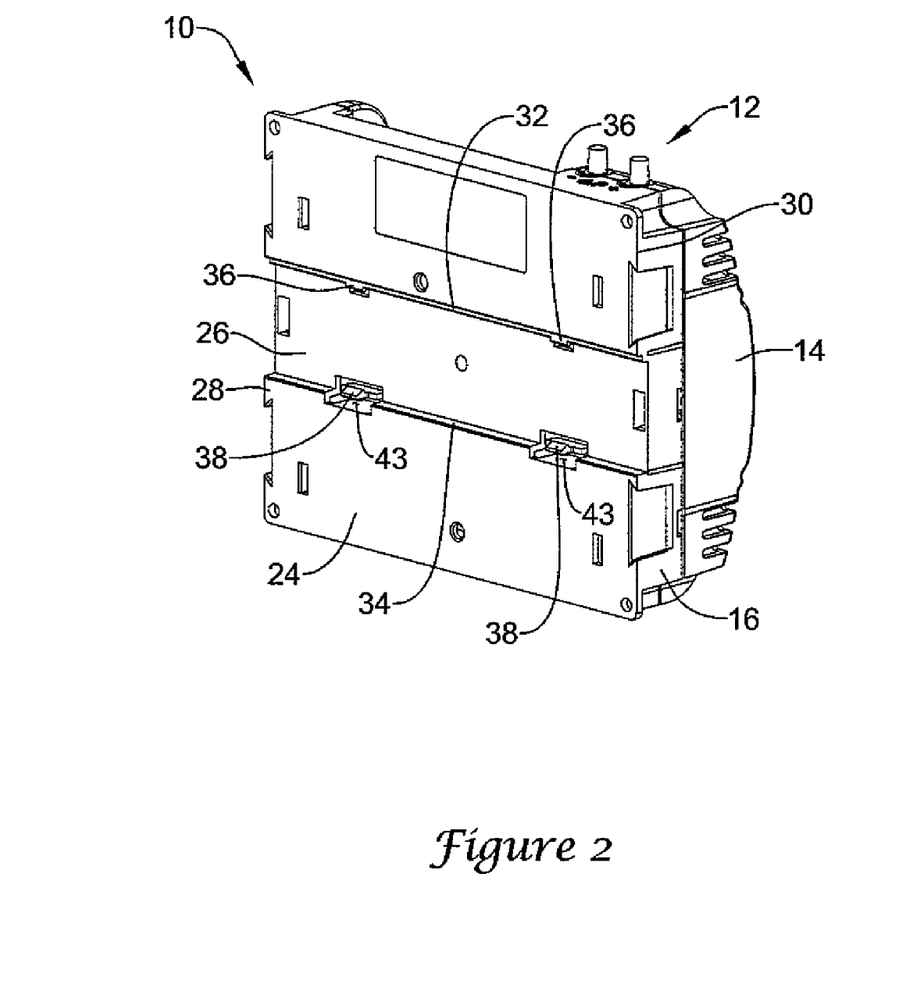
FIG. 2 is a perspective rear view of the device of FIG. 1, shown without the DIN rail.

FIG. 2 is a perspective rear view of the illustrative electronic device 10 of FIG. 1, providing a better view of rear housing 16. In some instances, rear housing 16 may be considered as including a rear surface 24. An elongate mounting recess 26 may be formed within rear surface 24. It will be recognized that mounting recess 26 may be configured to have a depth and width that is appropriate to accommodate DIN rail 18 (see FIG. 1). In the illustrative embodiment, rear surface 24 has a first side edge 28 and a second side edge 30, with the mounting recess 26 extending between the first side edge 28 and the second side edge 30. Mounting recess 26 may be seen as having an upper edge 32 and a lower edge 34.

In some cases, one or more rigid latches 36 may be formed within rear surface 24 along upper edge 32. In this disclosure, the terms upper, upward, lower and downward and non-limiting, and merely refer to the orientation illustrated. Other orientations are contemplated as well. In the illustration, two rigid latches 36 are provided. However, it is contemplated that upper edge 32 may include only a single rigid latch 36, or may include three, four or more rigid latches 36. The number of rigid latches 36 may be varied to suit a particular application and may, for example, be at least partially a function of the overall size and/or weight of electronic device 10, and/or the material used to form housing 12 and/or DIN rail 18. In some cases, rigid latches 36 may be tabs or other extending elements that are integrally formed within rear surface 24 and that extend partially into mounting recess 26.

In some instances, one or more flexible latches 38 may be formed within rear surface 24 near lower edge 34. In the illustration, two flexible latches 38 are shown. However, it is contemplated that lower edge 34 may include only a single flexible latch 38, or may include three, four or more flexible latches 38. The number of flexible latches 38 may be varied to suit a particular application and may, for example, be at least partially a function of the overall size and/or weight of electronic device 10, and/or the material used to form housing 12 and/or DIN rail 18. The form and structure of flexible latches 38 are more clearly illustrated in subsequent Figures.

In some instances, rigid latches 36 and/or flexible latches 38, whether there are one, two, three or more of each, may be disposed on projections (not shown) or otherwise formed such that they extend above rear surface 24. In some cases, rigid latches 36 and flexible latches 38 may extend above rear surface 24 a distance sufficient to accommodate DIN rail 18 therebetween without requiring inclusion of elongate mounting recess 26.

In some illustrative embodiments, rear housing 16, which includes rear surface 24, mounting recess 26, rigid latches 36 and flexible latches 38, may be integrally formed as a unitary structure. In some cases, rear housing 16 may be polymeric, and may be stamped, molded or otherwise formed as a unitary structure. In other cases, it is contemplated that rear housing 16 may be metallic, and may be stamped, molded or otherwise formed as a unitary structure. In this, a unitary structure that is integrally formed is considered to be a structure that does not have any distinct pieces or elements that are formed separately and then subsequently brought or joined together. In some cases, integrally forming a unitary structure may have manufacturing advantages.

Figure 3:
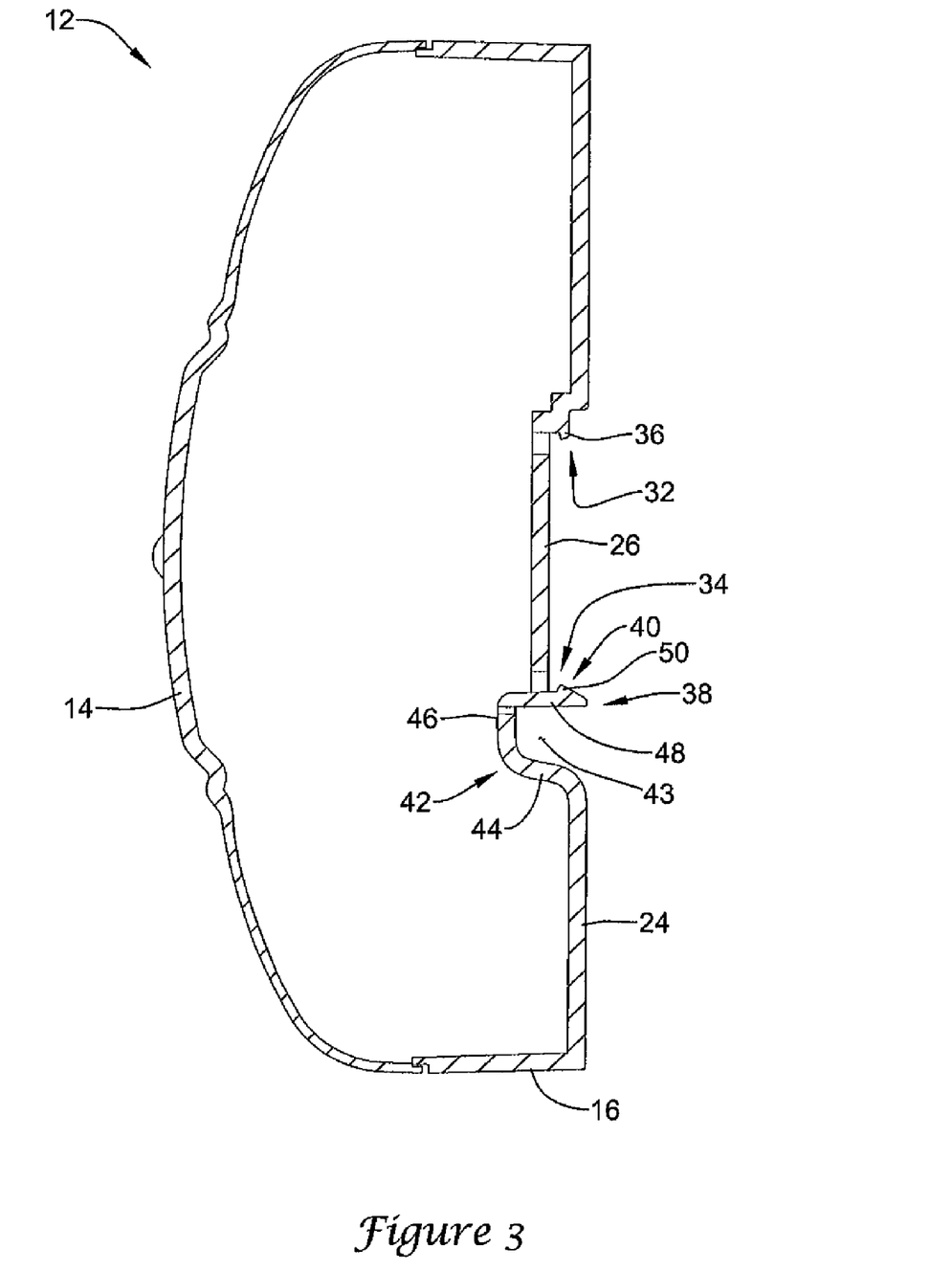
FIG. 3 is a diagrammatic cross-sectional side view of the device of FIG. 2.

FIG. 3 is a diagrammatic cross-sectional side view of the housing 12 of FIG. 2 that illustrates more clearly the features of the rigid latches 36 and flexible latches 38. In this cross-sectional view, only one rigid latch 36 and one flexible latch 38 are visible. As indicated above, rigid latch 36 may be formed within rear surface 24 along upper edge 32, and flexible latch 38 may be formed within rear surface 24 along lower edge 34. In some cases, rigid latch 36 may be a tab or other extending element that is integrally formed within rear surface 24. Rigid latch 36 may be adapted to engage upper flange 20 of DIN rail 18 (FIG. 1), and may help prevent an upper portion of electrical device 10 from moving laterally away from DIN rail 18.

In the illustrative embodiment, flexible latch 38 may be considered as having a U-shaped and/or a C-shaped cross-sectional profile, but this is not required. In some instances, as illustrated, flexible latch 38 may include an engagement portion 40 that may be adapted to releasably interact with lower flange 22 of DIN rail 18 (FIG. 1), as well as a flexible portion 42 that is configured to permit engagement portion 40 to deflect downward in response to an applied force.

In some instances, flexible latch 38 may be considered as including a first segment 44 that is at least substantially perpendicular to rear surface 24, an adjoining second segment 46 that is at least substantially perpendicular to first segment 44 and that is substantially parallel to rear surface 24, and a third section 48 that is at least substantially perpendicular to second segment 46 and at least substantially parallel to first segment 44. In some cases, the third segment 48 may be considered as forming at least part of engagement portion 40 while first segment 44 and/or second segment 46 may, either separately or in combination, form at least part of flexible portion 42. A recess or opening 43 may be provided between the first segment 44 and the third segment 48, which may provide the space and allow the first segment 44 to deflect in a downward direction in response to a corresponding applied force. In some instances, engagement portion 40 may include a tab 50 that can help secure electrical device 10 to DIN rail 18. Tab 50 may engage lower flange 22 of DIN rail 18, and may help prevent a lower portion of electrical device 10 from moving laterally away from DIN rail 18.

Figure 4:
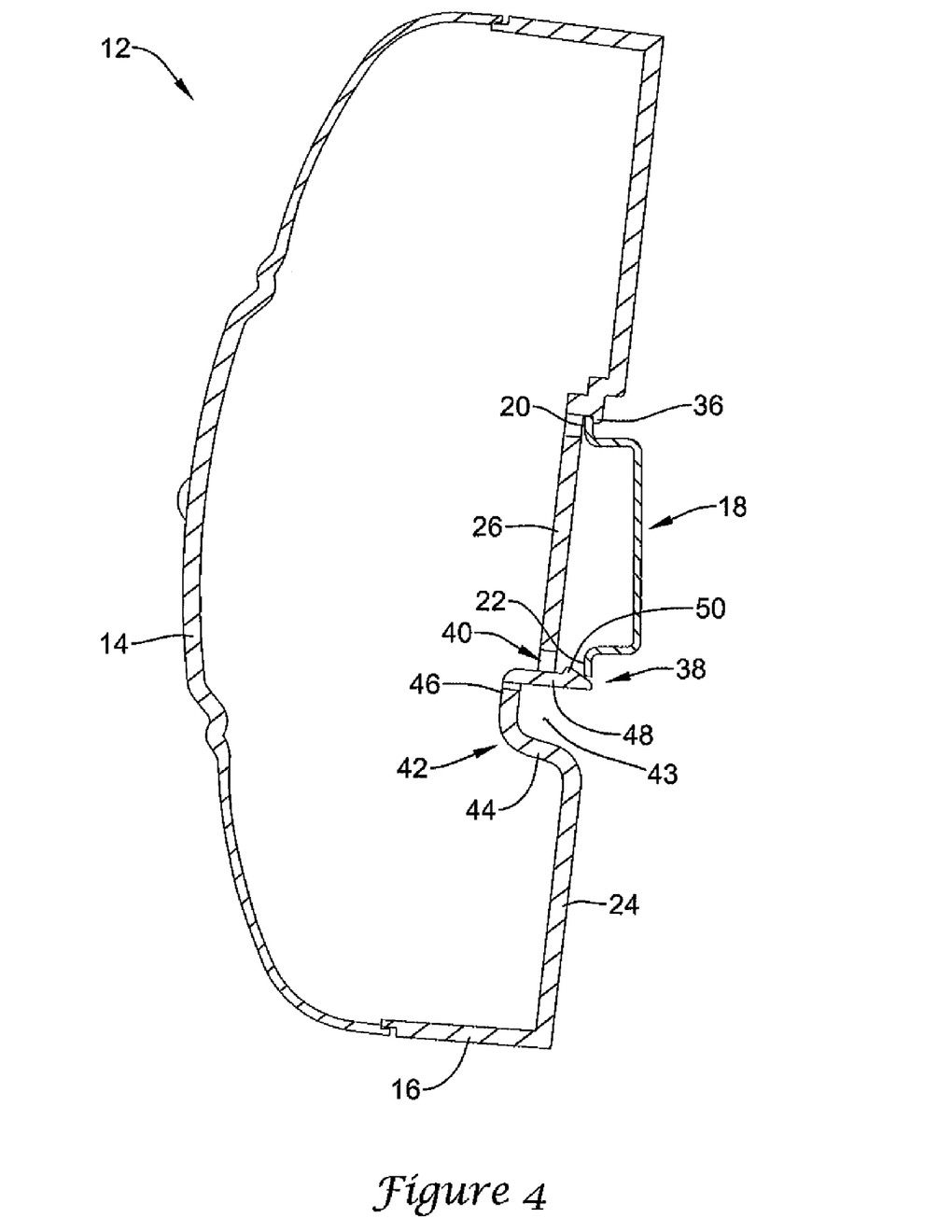
FIG. 4 is a diagrammatic cross-sectional side view of the device and DIN rail of FIG. 1, illustrating installation of the device on the DIN rail.

FIG. 4 is a diagrammatic cross-sectional side view of the device and DIN rail of FIG. 1, illustrating one method of mounting the device on DIN rail 18. In some instances, electrical device 10 may be installed or otherwise mounted onto DIN rail 18 by engaging rigid latch 36 onto top flange 20 of DIN rail 18 as shown. As discussed above, electrical device 10 may include one, two, three or more distinct rigid latches 36, as desired. In some illustrative embodiments, electrical device 10 may be able to hang in this position, otherwise unsupported, if necessary prior to completion of installation.

In this position, it can be seen that tab 50 of flexible latch 38 is just contacting lower flange 22 of DIN rail 18. As discussed above, electrical device 10 may include one, two, three or more distinct flexible latches 38, as desired. It will be recognized that applying an inward force (toward DIN rail 18) to housing 12, or at least along a lower portion of housing 12, will cause flexible latch 38 to deflect downward enough to snap onto lower flange 22 of DIN rail 18.

In some instances, electrical device 10 may be mounted onto DIN rail 18 by first positioning electrical device 10 such that flexible latch 38 is engaged with lower flange 22 of DIN rail 18. Electrical device 10 may then be lifted upward sufficiently for rigid latch 36 to clear upper flange 20 of DIN rail 18. Allowing electrical device 10 to settle downward will then cause rigid latch 36 to engage with upper flange 20 of DIN rail 18, thereby securing electrical device 10 to DIN rail 18.

In some cases, electrical device 10 may be mounted onto DIN rail 18 by first positioning electrical device 10 such that rigid latch 36 is proximate upper flange 20 of DIN rail 18 and flexible latch 38 is positioned proximate lower flange 22 of DIN rail 18. Electrical device 10 may then be secured onto DIN rail 18 by pushing electrical device 10 towards DIN rail 18, thereby engaging rigid latch 36 and flexible latch 38 at the same or nearly the same time.

If desired, electrical device 10 may be installed onto DIN rail 18 in an upside-down configuration in which rigid latch 36 would be (in the installed orientation) along the bottom of electrical device 10 and flexible latch 38 would be along the top of electrical device 10. In this orientation, electrical device 10 could be installed by first engaging rigid latch 36 with lower flange 22 of DIN rail 18, followed by snapping flexible latch 38 onto upper flange 22 of DIN rail 18. If desired, electrical device 10 could be installed by first engaging flexible latch 38, as discussed above. In some cases, electrical device 10 can be installed by engaging rigid latch 36 and flexible latch 38 at the same or nearly the same time, as discussed above.

Once installed, electrical device 10 may be easily removed from DIN rail 18, as further described below with respect to FIGS. 5 through 7.

Figure 5:
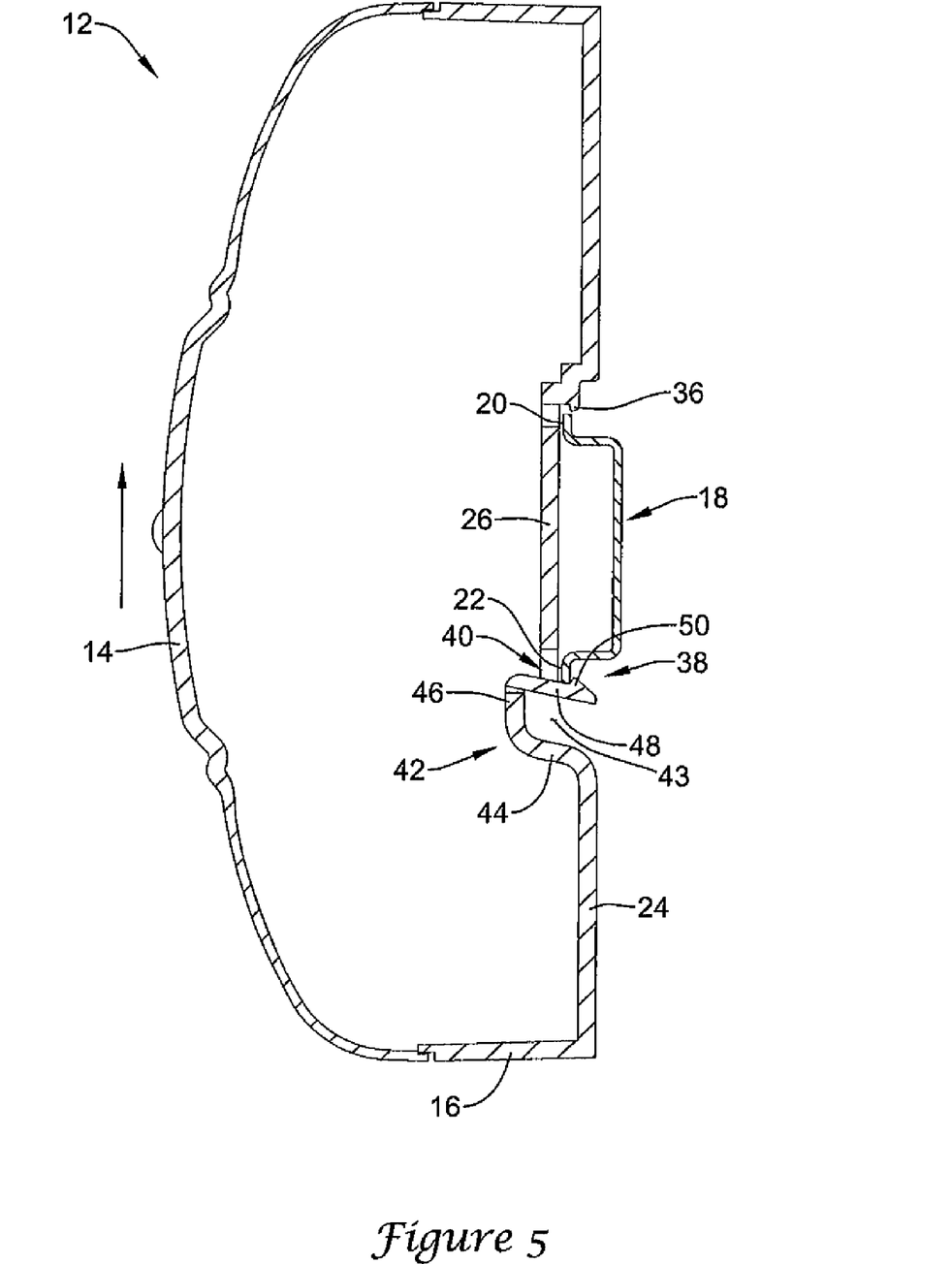
FIGS. 5 through 7 are diagrammatic cross-sectional side views of the device and DIN rail of FIG. 1, showing one illustrative method for removing the device from the DIN rail.
Figure 6:
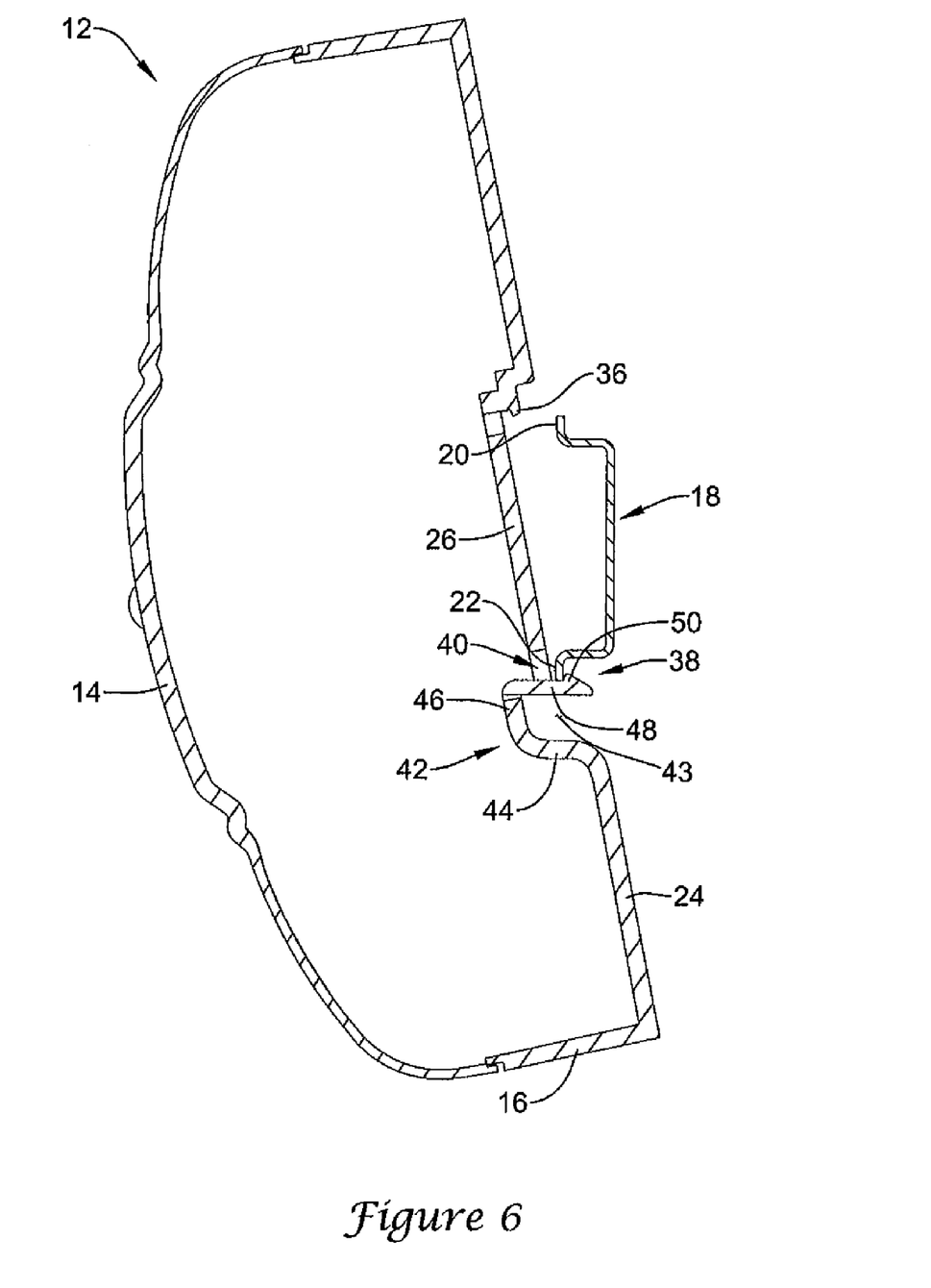
Figure 7:
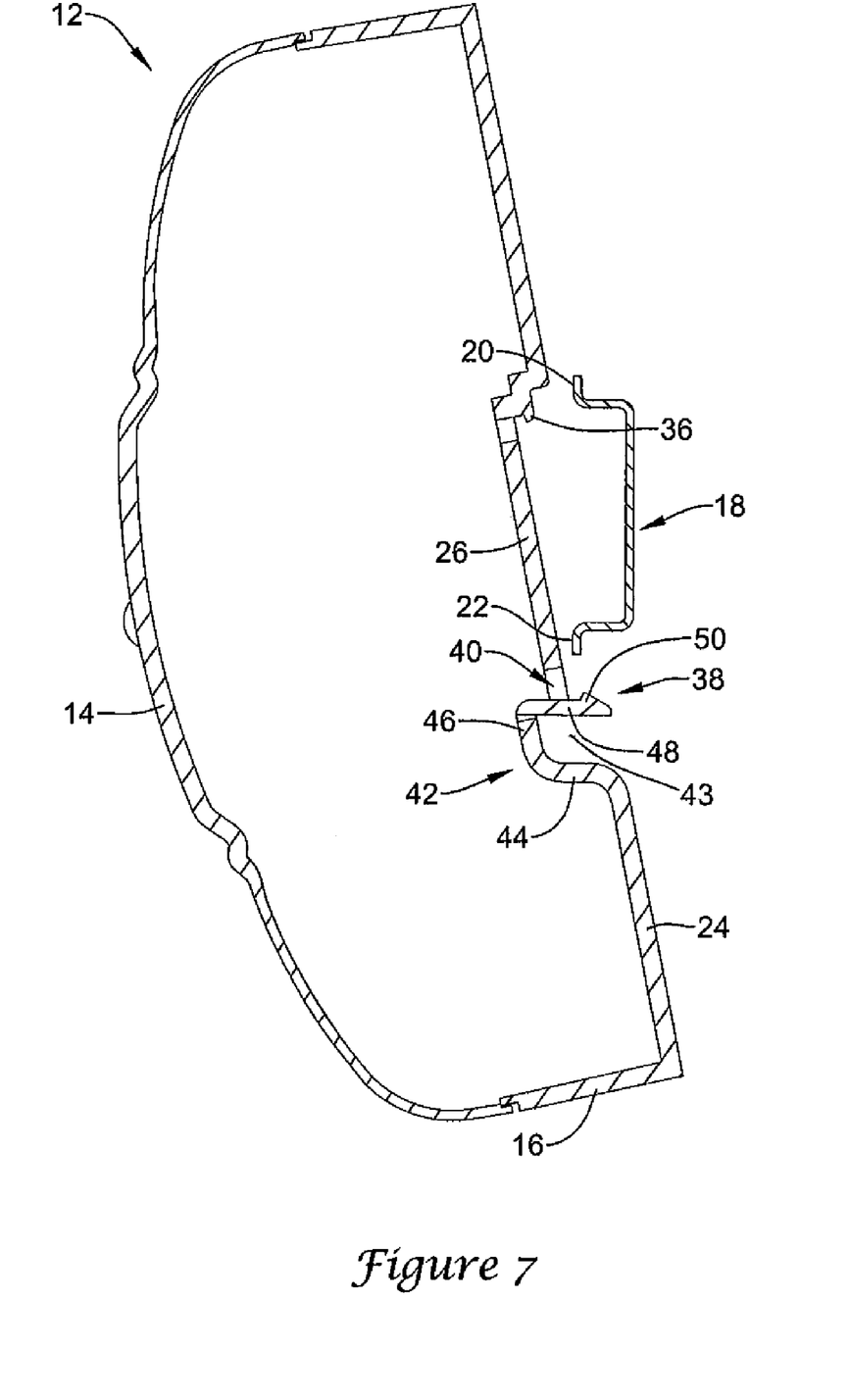

FIGS. 5 through 7 are diagrammatic cross-sectional side views of the device and DIN rail of FIG. 1, showing one illustrative method for removing the device from the DIN rail. It will be recognized that the removal method may vary, depending on the relative orientation of electrical device 10 to DIN rail 18.

In FIG. 5, electrical device 10 has been moved upward (relative to the DIN rail 18) a distance that is sufficient to permit rigid latch 36 to become disengaged from top flange 20 of DIN rail 18. It can be seen that in moving electrical device 10 upwards, lower flange 22 of DIN rail 18 has caused flexible latch 38 to deform or bend downwards, thereby permitting the upward movement of electrical device 10. In FIG. 6, electrical device 10 has been tilted forwards, away from DIN rail 18, at which point the electrical device 10 can be lowered to disengage tab 50 of flexible latch 38 from lower flange 22 of DIN rail 18, as seen in FIG. 7.

FIGS. 4 through 7 demonstrate that electrical device 10 may be easily mounted and dismounted from DIN rail 18. In particular, electrical device 10 may be easily removed from DIN rail 18 by an individual without requiring the use of tools or levers to release any latch or other structure. No assistance is necessary, as the design of electrical device 10 permits a user to grasp housing 12 and manipulate housing 12 as discussed with respect to FIG. 4 through FIG. 7. An individual can easily mount, dismount and/or move electrical device 10 along the DIN rail 18 as desired, thereby providing a significant advantage over previous DIN rail mounting systems.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. An electronic device adapted to be secured to a DIN rail, the DIN rail having a first flange and a second flange, the electronic device comprising:

a housing having a rear surface and a mounting recess formed within the rear surface, the mounting recess configured to accommodate the DIN rail;

a rigid latch disposed near the mounting recess such that the rigid latch is positioned to engage the first flange of the DIN rail when the DIN rail is disposed within the mounting recess;

a flexible latch integrally molded within the housing, the flexible latch disposed near the mounting recess such that the flexible latch is positioned to engage the second flange of the DIN rail when the DIN rail is disposed within the mounting recess;

wherein the flexible latch is configured to be sufficiently deflectable by movement of the electronic device relative to the DIN rail to permit the electronic device to be moved sufficiently far relative to the DIN rail to disengage the rigid latch from the first flange of the DIN rail; and wherein the flexible latch comprises a U-shaped and/or a C-shaped cross-sectional profile, and further comprises, in cross-section, a first segment at least substantially perpendicular to the rear surface, an adjoining second segment that is at least substantially perpendicular to the first segment and parallel to the rear surface, and a third section that is at least substantially perpendicular to the second segment and at least substantially parallel to the first segment.

* * * * *